United States Patent
Urano et al.

(10) Patent No.: US 11,242,649 B2
(45) Date of Patent: Feb. 8, 2022

(54) INK SET FOR TEXTILE PRINTING AND METHOD FOR PRODUCING PRINTED TEXTILE ITEM

(71) Applicant: RISO KAGAKU CORPORATION, Tokyo (JP)

(72) Inventors: Yuki Urano, Ibaraki (JP); Takahisa Yamazaki, Ibaraki (JP); Hideki Imanishi, Ibaraki (JP); Shunsuke Uozumi, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 830 days.

(21) Appl. No.: 15/895,831

(22) Filed: Feb. 13, 2018

(65) Prior Publication Data

US 2018/0237987 A1 Aug. 23, 2018

(30) Foreign Application Priority Data

Feb. 22, 2017 (JP) .............................. JP2017-030798

(51) Int. Cl.
| | | |
|---|---|---|
| C09D 11/00 | (2014.01) | |
| D06P 1/44 | (2006.01) | |
| D06P 5/30 | (2006.01) | |
| C09D 11/322 | (2014.01) | |
| C09D 11/54 | (2014.01) | |
| D06P 1/52 | (2006.01) | |
| D06P 5/00 | (2006.01) | |
| C09D 11/38 | (2014.01) | |
| C09D 11/40 | (2014.01) | |
| C09D 1/00 | (2006.01) | |
| C09D 4/00 | (2006.01) | |
| C09D 5/00 | (2006.01) | |
| C09K 3/00 | (2006.01) | |
| D06P 1/56 | (2006.01) | |
| D06P 1/58 | (2006.01) | |

(52) U.S. Cl.
CPC ............ *D06P 1/445* (2013.01); *C09D 11/322* (2013.01); *C09D 11/38* (2013.01); *C09D 11/40* (2013.01); *C09D 11/54* (2013.01); *D06P 1/5257* (2013.01); *D06P 5/002* (2013.01); *D06P 5/30* (2013.01); *D06P 1/525* (2013.01); *D06P 1/5207* (2013.01); *D06P 1/5221* (2013.01); *D06P 1/5228* (2013.01); *D06P 1/5235* (2013.01); *D06P 1/5278* (2013.01); *D06P 1/5285* (2013.01); *D06P 1/56* (2013.01); *D06P 1/58* (2013.01)

(58) Field of Classification Search
USPC ...................... 106/31.01, 31.13, 31.6, 31.85
See application file for complete search history.

(56) References Cited

U.S. PATENT DOCUMENTS

| | | | |
|---|---|---|---|
| 2010/0214352 A1* | 8/2010 | Tsunoda ..................... | D06P 1/44 347/21 |
| 2011/0069109 A1 | 3/2011 | Tojo | |
| 2012/0212539 A1 | 8/2012 | Hirato et al. | |
| 2015/0091974 A1 | 4/2015 | Aoyama et al. | |
| 2015/0239261 A1* | 8/2015 | Sugiyama .............. | C08K 5/098 347/21 |

FOREIGN PATENT DOCUMENTS

| | | |
|---|---|---|
| JP | S63-031594 B2 | 6/1988 |
| JP | H04-33913 B2 | 6/1992 |
| JP | 2009096914 A | 5/2009 |
| JP | 2009-227909 | 10/2009 |
| JP | 2010150454 A | 7/2010 |
| JP | 2011-063001 | 3/2011 |
| JP | 2012-041379 | 3/2012 |
| JP | 2015-024508 | 2/2015 |
| JP | 2015-045003 | 3/2015 |
| JP | 2015-091640 | 5/2015 |
| JP | 2015-161043 | 9/2015 |
| JP | 2017-025322 | 2/2017 |

OTHER PUBLICATIONS

Office Action issued for the counterpart Japanese Patent Application No. 2017-030798, dated Jan. 26, 2021, 5 pages including machine translation.

* cited by examiner

*Primary Examiner* — James E McDonough
(74) *Attorney, Agent, or Firm* — Hamre, Schumann, Mueller & Larson, P.C.

(57) ABSTRACT

An ink set for textile printing is disclosed which includes a pretreatment liquid containing a metal salt, a water-dispersible resin (A), an organic solvent (B) having an SP value of 10 to 14 $(cal/cm^3)^{1/2}$ and water, and an ink containing a pigment, a water-dispersible resin (C) having a glass transition point of 10° C. or higher, an organic solvent (D) and water. A method for producing a printed textile item is also disclosed.

19 Claims, No Drawings

INK SET FOR TEXTILE PRINTING AND METHOD FOR PRODUCING PRINTED TEXTILE ITEM

CROSS REFERENCE TO RELATED APPLICATIONS

This application is based upon and claims the benefit of priority from the prior Japanese Patent Application No. 2017-030798, filed on Feb. 22, 2017, the entire contents of which are incorporated by reference herein.

BACKGROUND OF THE INVENTION

Field of the Invention

Embodiments of the present invention relate to an ink set for textile printing, and a method for producing a printed textile item.

Description of the Related Art

The inkjet printing method is capable of non-contact variable data printing, and is suited to small-lot printing to all manner of substrates. Among the various possible substrates, the inkjet printing method is particularly suited to printing to fabrics, which are prone to substrate wrinkling during contact printing.

Examples of the colorants that are used in inkjet inks include pigments and dyes.

Dye inks have the advantages of offering superior color development and good color fastness. However, when dye inks are used, the time required for the printing process is generally longer, due to issues such as the requirement for a cleaning step to remove unfixed dye following printing, and in the case of printing to a dark-colored substrate, the requirement for a substrate decolorization step using a discharge ink.

In contrast, when pigment inks are used, a cleaning step is generally not required after printing, and when printing is performed to a dark-colored substrate, a method can be used in which a white ink or the like is printed as a base coat, meaning the work flow process can be shortened.

However, in the case of pigment inks, the bonding strength between the substrate and the ink coating film is comparatively weak, and the ink coating film tends to be thicker. As a result, the adhesion between the ink and the substrate and the scratch resistance of the ink image of the printed portion may be issues.

JP 2009-96914 A proposes a method for improving the fastness properties using an ink containing a polyol having an SP value of 10 to 15.5 $(cal/cm^3)^{1/2}$ as a water-soluble organic solvent, and a urethane resin having a glass transition point within a range from −35 to 10° C. as a water-dispersible resin.

JP 2010-150454 A proposes a method for improving the fastness properties using a pretreatment agent containing a water-dispersible resin having a glass transition point of 10° C. or lower, a prescribed ink, a middle coat agent, and an overcoat agent.

SUMMARY OF THE INVENTION

According to an embodiment of the present invention, an ink set for textile printing is provided which includes:
a pretreatment liquid containing a metal salt, a water-dispersible resin (A), an organic solvent (B) having an SP value of 10 to 14 $(cal/cm^3)^{1/2}$ and water, and an ink containing a pigment, a water-dispersible resin (C) having a glass transition point of 10° C. or higher, an organic solvent (D) and water.

According to another embodiment of the present invention, a method for producing a printed textile item is provided, the method including applying a pretreatment liquid containing a metal salt, a water-dispersible resin (A), an organic solvent (B) having an SP value of 10 to 14 $(cal/cm^3)^{1/2}$ and water to a substrate, and applying an ink containing a pigment, a water-dispersible resin (C) having a glass transition point of 10° C. or higher, an organic solvent (D) and water to the substrate to which the pretreatment liquid has been applied.

DETAILED DESCRIPTION OF THE EMBODIMENTS

In JP 2009-96914 A, washing fastness and the like were investigated, but no investigation was made of the scratch resistance of the printed portion. The method proposed in JP 2010-150454 A includes an overcoat step.

When a pretreatment liquid is used for a purpose such as improving the color development of a pigment ink, if a resin that exhibits strong adhesion to the ink coating film is used in the pretreatment liquid, then the unprinted portion of the pretreatment liquid-coated region, where an ink image has not been formed, can sometimes develop stickiness.

Accordingly, an object of the present invention is to provide an ink set for textile printing that is capable of producing a printed item having excellent adhesion between the ink and the substrate such as a fabric, excellent scratch resistance of the ink image within the printed portion, and reduced stickiness within the unprinted portion, and also to provide a method for producing a printed textile item.

Embodiments of the present invention are described below, but the present invention is in no way limited by the following embodiments.

[Ink Set for Textile Printing]

An ink set for textile printing according to one embodiment of the present invention includes a pretreatment liquid containing a metal salt, a water-dispersible resin (A), an organic solvent (B) having an SP value of 10 to 14 $(cal/cm^3)^{1/2}$ and water, and an ink containing a pigment, a water-dispersible resin (C) having a glass transition point of 10° C. or higher, an organic solvent (D) and water. In the following description, the "ink set for textile printing" is sometimes referred to as simply "the ink set".

This ink set can be used favorably for textile printing.

By selecting a water-dispersible resin (C) having a glass transition point (hereafter, "glass transition point" is sometimes abbreviated as "Tg") of 10° C. or higher as the water-dispersible resin contained in the ink, the hardness of the coating film formed by the water-dispersible resin can be increased, enabling an improvement in the scratch resistance of the ink image.

On the other hand, when the glass transition point of the water-dispersible resin contained in the ink is high, the adhesion between the ink and the substrate tends to deteriorate. Further, when a pretreatment liquid containing a metal salt is used to cause aggregation of the ink components to improve the ink color development properties, because penetration of the ink tends to be suppressed, the anchoring effect tends to weaken, and the adhesion between the ink and the substrate tends to deteriorate.

If a solvent is then added to the ink to swell the resin in order to improve the adhesion between the ink and the substrate, this can sometimes cause a deterioration in the scratch resistance of the ink image.

However, when an ink containing the water-dispersible resin (C) having a glass transition point of 10° C. or higher is used together with a pretreatment liquid containing the organic solvent (B) having an SP value of 10 to 14 $(cal/cm^3)^{1/2}$, a printed item can be produced for which the adhesion between the ink and the substrate such as a fabric, and the scratch resistance of the ink image of the printed portion are both excellent, and the stickiness of the unprinted portion is reduced.

Specifically, by ensuring that the SP value of the organic solvent (B) in the pretreatment liquid is not more than 14 $(cal/cm^3)^{1/2}$, the organic solvent (B) is able to cause swelling of the resin coating film formed by the water-dispersible resin (C) of the ink at the substrate side of the ink coating film formed on the pretreatment liquid, thereby enhancing the adhesion between the ink and the substrate. Further, by including this type of organic solvent (B) in the pretreatment liquid, the resin coating film is able to be swollen at only the substrate side of the ink coating film. As a result, the adhesion between the ink and the substrate can be improved while suppressing deterioration in the scratch resistance of the outer surface of the ink image.

When the SP value of the organic solvent (B) in the pretreatment liquid is at least 10 $(cal/cm^3)^{1/2}$, swelling of the water-dispersible resin (A) in the pretreatment liquid is unlikely, meaning stickiness can be reduced in the unprinted portion of the pretreatment liquid-coated region on the substrate where an ink image has not been formed.

In this description, the SP value refers to the SP value determined using the Fedors equation, and more specifically, is the value calculated using the equation below proposed by Fedors. In the following equation, $\Delta ei$ represents the evaporation energy of the atom or atom grouping of a component i, and $\Delta vi$ represents the molar volume of the atom or atom grouping of the component i (see Hansen Solubility Parameters: A User's Handbook, Second Edition, Charles M. Hansen, CRC Press, 2007)

$$\delta = [(sum\Delta ei)/(sum\Delta vi)]^{1/2}$$

Next is a description of the pretreatment liquid, which contains a metal salt, the water-dispersible resin (A), the organic solvent (B) having an SP value of 10 to 14 $(cal/cm^3)^{1/2}$, and water.

The metal salt in the pretreatment liquid may cause aggregation of the pigment in the ink, thereby improving the color development, and may also cause precipitation of the resin emulsion in the ink, thereby promoting formation of an ink film.

Either a monovalent metal salt or a divalent or higher polyvalent salt may be used as the metal salt, but a polyvalent metal salt is preferred.

The polyvalent metal salt is preferably composed of a divalent or higher polyvalent metal ion and an anion. Examples of the divalent or higher polyvalent metal ion include $Ca^{2+}$, $Mg^{2+}$, $Cu^{2+}$, $Ni^{2+}$, $Zn^{2+}$ and $Ba^{2+}$. Examples of the anion include $Cl^-$, $NO_3^-$, $CH_3COO^-$, $I^-$, $Br^-$ and $ClO_3^-$. Specific examples of the salt include calcium chloride, calcium nitrate, magnesium nitrate, copper nitrate, calcium acetate and magnesium acetate. These metal salts may be used individually, or a mixture of a plurality of different salts may be used.

The concentration of the metal salt in the pretreatment liquid is preferably about 1 to 25% by mass relative to the total mass of the pretreatment liquid.

The water-dispersible resin is a resin that can be dispersed in particulate form without dissolving in the water, thus forming an oil-in-water (O/W) emulsion.

Examples of the water-dispersible resin (A) include urethane resins, (meth)acrylic resins, styrene/(meth)acrylic resins, polyester resins, olefin resins, vinyl chloride resins, vinyl acetate resins, melamine resins and amide resins. These resins may be used individually, or a combination of two or more resins may be used.

The water-dispersible resin (A) may, for example, be added as an oil-in-water resin emulsion during the pretreatment liquid production process.

There are no particular limitations on the water-dispersible resin (A). The glass transition point of the water-dispersible resin (A) may be, for example, at least −40° C., and the glass transition point of the water-dispersible resin (A) may be, for example, 0° C. or higher. The glass transition point of the water-dispersible resin (A) is preferably at least 15° C., more preferably at least 18° C., and even more preferably 20° C. or higher. When the glass transition point of the water-dispersible resin (A) is 15° C. or higher, the stickiness of the unprinted portion of the pretreatment liquid-coated region on the substrate, where an ink image has not been formed, can be further reduced. The glass transition point of the water-dispersible resin (A) is preferably not more than 60° C., and more preferably 55° C. or lower. When the glass transition point of the water-dispersible resin (A) is 60° C. or lower, the texture of the substrate can be more easily maintained.

From the viewpoint of further reducing the stickiness of the unprinted portion where the ink image has not been formed, the glass transition point of the water-dispersible resin (A) is preferably at least as high as the glass transition point of the water-dispersible resin (C) in the ink, and may be higher than the glass transition point of the water-dispersible resin (C).

Examples of commercially available resin emulsions that may be used as the water-dispersible resin (A) include PRINTRITE DP375 (a urethane resin, Tg=48° C.) manufactured by The Lubrizol Corporation, Mowinyl 780 (an acrylic resin, Tg=20° C.) manufactured by The Nippon Synthetic Chemical Industry Co., Ltd., Mowinyl 6750 (an acrylic resin, Tg=0° C.) manufactured by The Nippon Synthetic Chemical Industry Co., Ltd., SUPERFLEX 500M (a urethane resin, Tg=−39° C.) manufactured by DKS Co., Ltd., SUPERFLEX E-4800 (a urethane resin, Tg=−65° C.) manufactured by DKS Co., Ltd., and VINYBLAN 1002 (a vinyl acetate resin, Tg=31° C.) manufactured by Nissin Chemical Industry Co., Ltd.

The amount of the water-dispersible resin (A) in the pretreatment liquid, in terms of the resin solid fraction, is preferably within a range from 1 to 30% by mass, more preferably from 3 to 20% by mass, and even more preferably from 5 to 15% by mass, relative to the total mass of the pretreatment liquid.

The SP value of the organic solvent (B) is preferably from 10 to 14 $(cal/cm^3)^{1/2}$, and is more preferably from 10.5 to 13.0 $(cal/cm^3)^{1/2}$.

There are no particular limitations on the organic solvent (B) having an SP value of 10 to 14 $(cal/cm^3)^{1/2}$, and examples include glycol ethers such as diethylene glycol monobutyl ether (SP value: 10.5 $(cal/cm^3)^{1/2}$), triethylene glycol monoethyl ether (SP value: 10.6 $(cal/cm^3)^{1/2}$) and diethylene glycol monomethyl ether (SP value: 11.2 $(cal/cm^3)^{1/2}$); and alkanediols such as butanediol (for example, 1,2-butanediol, SP value: 12.8 $(cal/cm^3)^{1/2}$), hexanediol (for example, 1,6-hexanediol, SP value: 13.5 $(cal/cm^3)^{1/2}$, and 1,2-hexanediol, SP value: 11.8 $(cal/cm^3)^{1/2}$) and octanediol (for example, 1,2-octanediol, SP value: 11.2 $(cal/cm^3)^{1/2}$). Among these, a glycol ether is preferred.

The pretreatment liquid may contain either one organic solvent (B) having an SP value of 10 to 14 $(cal/cm^3)^{1/2}$, or a combination of two or more such solvents.

The pretreatment liquid may also contain another organic solvent besides the organic solvent (B) having an SP value of 10 to 14 $(cal/cm^3)^{1/2}$. In such cases, the organic solvent (B) having an SP value of 10 to 14 $(cal/cm^3)^{1/2}$ preferably represents at least 50% by mass of all the organic solvents contained in the pretreatment liquid, and more preferably represents at least 70% by mass of all the organic solvents. Further, the value obtained by averaging the SP values of all of the organic solvents contained in the pretreatment liquid based on the weight ratio between the solvents is preferably within a range from 10 to 14 $(cal/cm^3)^{1/2}$.

The SP value of the organic solvent (B) of the pretreatment liquid is preferably not more than the SP value of the organic solvent (D) in the ink, and may be lower than the SP value of the organic solvent (D). When the SP value of the organic solvent (B) of the pretreatment liquid is equal to or lower than the SP value of the organic solvent (D) of the ink, the resin coating film formed from the water-dispersible resin (C) in the ink can be more easily swollen at the substrate side of the ink coating film formed on the pretreatment liquid. As a result, the adhesion between the ink and the substrate can be more easily improved.

For example, the SP value of the organic solvent (B) of the pretreatment liquid may be not more than the SP value of the organic solvent (D) of the ink (or lower than the SP value of the organic solvent (D)), and/or the glass transition point of the water-dispersible resin (A) in the pretreatment liquid may be at least as high as the glass transition point of the water-dispersible resin (C) in the ink (or higher than the glass transition point of the water-dispersible resin (C)).

The amount of the organic solvent (B), relative to the total mass of the pretreatment liquid, may be from 1 to 25% by mass, or from 2 to 20% by mass, but from the viewpoint of substrate adhesion, is preferably from 5 to 15% by mass.

Although there are no particular limitations on the water included in the pretreatment liquid, a water containing no impurities is preferred. Examples of preferred waters include ion-exchanged water, distilled water and ultra-pure water.

The total amount of water in the pretreatment liquid, relative to the total mass of the pretreatment liquid, is preferably from 20 to 90% by mass, and more preferably from 50 to 80% by mass.

The pretreatment liquid may also include appropriate amounts of additives such as surface tension regulators (surfactants), fixing agents, pH regulators, antioxidants, preservatives and crosslinking agents, provided these additives do not impair the effects of the present invention. Examples of these types of additives include the same types of additives as those added to the ink described below.

There are no particular limitations on the method used for preparing the pretreatment liquid, and for example, the liquid can be prepared by mixing all of the components together.

Next is a description of the ink, which contains a pigment, the water-dispersible resin (C) having a glass transition point of 10° C. or higher, the organic solvent (D) and water.

The ink containing the pigment, the water-dispersible resin (C) having a glass transition point of 10° C. or higher, the organic solvent (D) and water may, for example, be an inkjet ink.

Any of the pigments typically used in this technical field may be used as the pigment. A white pigment can be used for a white ink, and a colored pigment other than white can be used for a colored ink.

Specific examples of the white pigment include inorganic pigments such as titanium oxide, zinc oxide, zinc sulfide, antimony oxide and zirconium oxide. Besides inorganic pigments, hollow resin microparticles and polymer microparticles may also be used. Of these pigments, from the viewpoint of the opacity, the use of titanium oxide is preferred. In those cases where titanium oxide is used, titanium oxide that has undergone a surface treatment with alumina or silica is preferably used in order to inhibit any photocatalytic action. The amount of this surface treatment agent preferably represents about 5 to 20% by mass of the pigment.

Examples of the non-white pigment include organic pigments such as azo-based pigments, phthalocyanine-based pigments, dye-based pigments, condensed polycyclic pigments, nitro-based pigments, and nitroso-based pigments (such as brilliant carmine 6B, lake red C, Watchung red, disazo yellow, Hansa yellow, phthalocyanine blue, phthalocyanine green, alkali blue and aniline black); inorganic pigments, including metals such as cobalt, iron, chromium, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black.

The average particle size of the pigment is preferably at least 50 nm from the viewpoint of the color development properties, but is preferably not more than 500 nm from the viewpoint of the discharge stability.

Any one of these pigments may be used individually, or a combination of two or more different pigments may be used.

The amount added of the pigment varies depending on the type of pigment used, but the ink preferably contains about 1 to 30% by mass, and more preferably 1 to 15% by mass, of the pigment relative to the total mass of the ink.

A pigment dispersant typified by polymeric dispersants and surfactant-type dispersants is preferably used to ensure stable dispersion of the pigment in the ink.

Examples of commercially available polymeric dispersants include the TEGO Dispers series manufactured by Evonik Industries AG (including TEGO Dispers 740W, TEGO Dispers 750W, TEGO Dispers 755W, TEGO Dispers 757W and TEGO Dispers 760), the Solsperse series manufactured by The Lubrizol Corporation (including Solsperse 20000, Solsperse 27000, Solsperse 41000, Solsperse 41090, Solsperse 43000, Solsperse 44000 and Solsperse 46000), the Joncryl series manufactured by Johnson Polymer, Inc. (including Joncryl 57, Joncryl 60, Joncryl 62, Joncryl 63, Joncryl 71 and Joncryl 501), as well as DISPERBYK-102, DISPERBYK-185, DISPERBYK-190, DISPERBYK-193 and DISPERBYK-199 manufactured by BYK Additives & Instruments GmbH, FUJI SP A-54 manufactured by Fuji Pigment Co., Ltd., and Polyvinylpyrrolidone K-30 and Polyvinylpyrrolidone K-90 manufactured by DKS Co. Ltd.

Examples of the surfactant-type dispersants include anionic surfactants such as the DEMOL series manufactured by Kao Corporation (including DEMOL EP, DEMOL N, DEMOL RN, DEMOL NL, DEMOL RNL and DEMOL T-45), and nonionic surfactants such as the EMULGEN series manufactured by Kao Corporation (including EMULGEN A-60, EMULGEN A-90, EMULGEN A-500, EMULGEN B-40, EMULGEN L-40 and EMULGEN 420).

These pigment dispersants may also be used in combinations containing a plurality of different dispersants.

When a pigment dispersant is used, there are no particular limitations on the amount of the pigment dispersant added to the ink, which varies depending on the type of dispersant used, but generally, the amount of the active component (solid fraction) of the pigment dispersant, reported as a mass ratio relative to a value of 1 for the pigment, is preferably within a range from 0.005 to 0.5.

Self-dispersing pigments in which the pigment surface has been modified with hydrophilic functional groups may also be used. Examples of commercially available self-dispersing pigments include the CAB-O-JET series manufactured by Cabot Corporation (including CAB-O-JET 200, CAB-O-JET 300, CAB-O-JET 250C, CAB-O-JET 260M and CAB-O-JET 270C), and the products BONJET BLACK CW-1S, CW-2, CW-3, CW-4, CW-5 and CW-6 manufactured by Orient Chemical Industries, Ltd.

Microencapsulated pigments in which the pigment is coated with a resin may also be used.

The water-dispersible resin (C) contained in the ink preferably has a glass transition point of 10° C. or higher.

From the viewpoint of further improving the scratch resistance of the ink image, the glass transition point of the water-dispersible resin (C) is preferably higher than 10° C., and more preferably 15° C. or higher.

From the viewpoint of reducing cracking of the ink coating film, the glass transition point of the water-dispersible resin (C) is preferably not higher than 50° C.

Examples of the water-dispersible resin (C) include urethane resins, (meth)acrylic resins, styrene/(meth)acrylic resins, polyester resins, olefin resins, vinyl chloride resins, vinyl acetate resins, melamine resins and amide resins, and of these, a urethane resin, (meth)acrylic resin or styrene/(meth)acrylic resin is preferred, and a urethane resin or acrylic resin is particularly desirable.

These resins may be used individually, or a combination of two or more resins may be used.

The water-dispersible resin (C) may, for example, be added as an oil-in-water resin emulsion during the ink production process.

Examples of commercially available resin emulsions that may be used as the water-dispersible resin (C) include SUPERFLEX 150H (a urethane resin, Tg=40° C.) manufactured by DKS Co., Ltd., SUPERFLEX 210 (a urethane resin, Tg=41° C.) manufactured by DKS Co., Ltd., Mowinyl 1752 (a styrene/acrylic resin, Tg=16° C.) manufactured by The Nippon Synthetic Chemical Industry Co., Ltd., Mowinyl 6969D (an acrylic resin, Tg=70° C.) manufactured by The Nippon Synthetic Chemical Industry Co., Ltd., and NeoCryl BT-62 (a styrene/acrylic resin, Tg=22° C.) manufactured by DSM Coating Resins D.V.

The ink may also contain another water-dispersible resin besides the water-dispersible resin (C) having a glass transition point of 10° C. or higher. In such cases, the water-dispersible resin (C) having a glass transition point of 10° C. or higher preferably represents at least 50% by mass of all the water-dispersible resins contained in the ink, and more preferably represents at least 80% by mass of all the water-dispersible resins. Further, the value obtained by averaging the glass transition points of all of the water-dispersible resins contained in the ink based on the weight ratio between the resins is preferably 10° C. or higher.

The amount of the water-dispersible resin (C) in the ink, calculated as the mass of the resin solid fraction relative to the total mass of the ink, is preferably from 1 to 20% by mass, more preferably from 3 to 17% by mass, and even more preferably from 5 to 15% by mass.

There are no particular limitations on the organic solvent (D), but the SP value of the solvent is preferably at least 14.5 $(cal/cm^3)^{1/2}$, and for example, may be at least 15 $(cal/cm^3)^{1/2}$ or 16 $(cal/cm^3)^{1/2}$ or higher. When the SP value of the organic solvent (D) is at least 14.5 $(cal/cm^3)^{1/2}$, the retention of residual organic solvent (D) in the ink coating film may be reduced, the ink coating film is less likely to undergo swelling, and the scratch resistance of the ink image of the printed portion can be more easily improved.

Examples of the organic solvent (D) include polyhydric alcohols such as glycerol (SP value: 16.4 $(cal/cm^3)^{1/2}$), diethylene glycol (SP value: 15.0 $(cal/cm^3)^{1/2}$) and ethylene glycol (SP value: 14.8 $(cal/cm^3)^{1/2}$).

There are no particular limitations on the water contained in the ink, but water containing minimal ionic components is preferred. In particular, from the viewpoint of the ink storage stability, the amount of polyvalent metal ions such as calcium ions is preferably kept low. Examples of the water include ion-exchanged water, distilled water and ultra-pure water.

The amount of water in the ink, relative to the total mass of the ink, is preferably from 20 to 90% by mass, and more preferably from 40 to 80% by mass.

The ink may also include appropriate amounts of other components, provided they do not impair the effects of the present invention. Examples of these other components include surface tension regulators (surfactants), fixing agents, pH regulators, antioxidants, preservatives and cross-linking agents.

Examples of compounds that can be used as surface tension regulators include anionic surfactants, cationic surfactants, amphoteric surfactants and nonionic surfactants, as well as polymer-based, silicone-based and fluorine-based surfactants.

Adding a surfactant may facilitate stable discharge of the ink by an inkjet method, and also makes it easier to appropriately control the penetration of the ink, and is consequently preferred. The amount added of the surfactant (the total amount of surfactant in those cases when a surfactant is also used as a pigment dispersant) varies depending on the type of surfactant used, but from the viewpoints of the ink surface tension and the rate of ink penetration into the substrate such as a fabric, the amount is preferably within a range from 0.1 to 10% by mass of the ink.

Specific examples of the anionic surfactants include the EMAL series (including EMAL 0, EMAL 10, EMAL 2F, EMAL 40 and EMAL 20C), the NEOPELEX series (including NEOPELEX GS, NEOPELEX G-15, NEOPELEX G-25 and NEOPELEX G-65), the PELEX series (including PELEX OT-P, PELEX TR, PELEX CS, PELEX TA, PELEX SS-L and PELEX SS-H), and the DEMOL series (including DEMOL N, DEMOL NL, DEMOL RN and DEMOL MS), all manufactured by Kao Corporation.

Examples of the cationic surfactants include the ACETAMIN series (including ACETAMIN 24 and ACETAMIN 86), the QUARTAMIN series (including QUARTAMIN 24P, QUARTAMIN 86P, QUARTAMIN 60W and QUARTAMIN 86W), and the SANISOL series (including SANISOL C and SANISOL B-50), all manufactured by Kao Corporation.

Examples of the nonionic surfactants include acetylene glycol-based surfactants, such as the Surfynol series manufactured by Air Products and Chemicals, Inc. (including Surfynol 104E, Surfynol 104H, Surfynol 420, Surfynol 440, Surfynol 465 and Surfynol 485) and Olfine E1004, Olfine E1010 and Olfine E1020 manufactured by Nissin Chemical Industry Co., Ltd., and polyoxyethylene alkyl ether-based surfactants, such as the EMULGEN series manufactured by Kao Corporation (including EMULGEN 102KG, EMULGEN 103, EMULGEN 104P, EMULGEN 105, EMULGEN 106, EMULGEN 108, EMULGEN 120, EMULGEN 147, EMULGEN 150, EMULGEN 220, EMULGEN 350, EMULGEN 404, EMULGEN 420, EMULGEN 705, EMULGEN 707, EMULGEN 709, EMULGEN 1108, EMULGEN 4085 and EMULGEN 2025G).

Examples of the amphoteric surfactants include the AMPHITOL series manufactured by Kao Corporation (including AMPHITOL 20BS, AMPHITOL 24B, AMPHITOL 86B, AMPHITOL 20YB and AMPHITOL 20N).

An electrolyte may be added to the ink to adjust the viscosity and/or pH of the ink. Examples of the electrolyte include sodium sulfate, potassium hydrogen phosphate, sodium citrate, potassium tartrate and sodium borate, and combinations of two or more electrolytes may also be used. Other compounds such as sulfuric acid, nitric acid, acetic acid, sodium hydroxide, potassium hydroxide, ammonium hydroxide and triethanolamine may also be used as ink thickening assistants or pH modifiers.

By adding an antioxidant, oxidation of the ink components can be prevented, and the storage stability of the ink can be improved. Examples of antioxidants that may be used include L-ascorbic acid, sodium L-ascorbate, sodium isoascorbate, potassium sulfite, sodium sulfite, sodium thiosulfate, sodium dithionite and sodium pyrosulfite.

By adding a preservative, decomposition of the ink can be prevented and the storage stability of the ink can be improved. Examples of preservatives that may be used include isothiazolone-based preservatives such as 5-chloro-2-methyl-4-isothiazolin-3-one, 2-methyl-4-isothiazolin-3-one, 2-n-octyl-4-isothiazolin-3-one and 1,2-benzisothiazolin-3-one; triazine-based preservatives such as hexahydro-1,3,5-tris(2-hydroxyethyl)-s-triazine; pyridine-based and quinoline-based preservatives such as sodium 2-pyridinethiol 1-oxide and 8-oxyquinoline; dithiocarbamate-based preservatives such as sodium dimethyldithiocarbamate; organobromine-based preservatives such as 2,2-dibromo-3-nitrilopropionamide, 2-bromo-2-nitro-1,3-propanediol, 2,2-dibromo-2-nitroethanol and 1,2-dibromo-2,4-dicyanobutane; as well as methyl p-hydroxybenzoate, ethyl p-hydroxybenzoate, potassium sorbate, sodium dehydroacetate and salicylic acid.

By using a crosslinking agent, powerful linkages can be formed between resin molecules and/or between the resin and the colorant, thereby reducing the likelihood of cohesive failure.

Examples of the crosslinking agent include blocked isocyanate-based compounds, which promote crosslinking under heating.

There are no particular limitations on the method used for preparing the ink, and for example, the desired ink can be obtained by appropriately mixing all of the components.

The viscosity of the ink may be adjusted as appropriate, but from the viewpoint of the discharge properties, is preferably within a range from 1 to 30 mPa·s. This viscosity value describes the ink viscosity at 3 Pa when the shear stress is increased from 0 Pa at a rate of 0.1 Pa/s at a temperature of 23° C.

The ink set according to one embodiment of the present invention includes the pretreatment liquid containing the metal salt, the water-dispersible resin (A), the organic solvent (B) having an SP value of 10 to 14 $(cal/cm^3)^{1/2}$ and the water described above, and the ink containing the pigment, the water-dispersible resin (C) having a glass transition point of 10° C. or higher, the organic solvent (D) and the water described above, but the ink set may also include other components besides the components above, provided these other components do not impair the effects of the present invention. For example, the ink set may also include another treatment liquid and/or an overcoat liquid. Further, the ink set may also include another ink.

Further, the ink set may include a plurality of inks which each contain a pigment, the water-dispersible resin (C) having a glass transition point of 10° C. or higher, the organic solvent (D) and water.

Although there are no particular limitations on the substrate used as the printing target for this ink set, the ink set is particularly suited to printing to fabrics. These fabrics are described below.

[Method for Producing Printed Textile Item]

A method for producing a printed textile item according to one embodiment of the present invention is a method for producing a printed textile item, including applying the aforementioned pretreatment liquid containing the metal salt, the water-dispersible resin (A), the organic solvent (B) having an SP value of 10 to 14 $(cal/cm^3)^{1/2}$ and water to a substrate (which may hereafter be referred to as "step (1)"), and applying the aforementioned ink containing the pigment, the water-dispersible resin (C) having a glass transition point of 10° C. or higher, the organic solvent (D) and water to the substrate to which the pretreatment liquid has been applied (which may hereafter be referred to as "step (2)").

The method for producing a printed textile item according to the preset embodiment may be a method for producing a printed textile item using the inkset described above.

When the ink containing the pigment, the water-dispersible resin (C) having a glass transition point of 10° C. or higher, the organic solvent (D) and water is coated on top of the pretreatment liquid containing the metal salt, the water-dispersible resin (A), the organic solvent (B) having an SP value of 10 to 14 $(cal/cm^3)^{1/2}$ and water, the obtained printed textile item may exhibit excellent adhesion between the ink and the substrate such as a fabric, and may also exhibit excellent scratch resistance of the ink image of the printed portion. Further, even if the region across which the pretreatment liquid has been applied includes an unprinted portion in which the ink image has not been formed, the stickiness of this unprinted portion can be reduced.

Although there are no particular limitations on the substrate, fabrics can be used particularly favorably. Examples of fabrics that may be used include fabrics formed from any natural and/or synthetic fibers such as cotton, silk, wool, hemp, nylon, polyester, rayon, acetate and cupra. The fabric may be a woven fabric, a knitted fabric, or a nonwoven fabric or the like.

Further, the substrate may be a colored substrate. For example, the substrate may be black or a dark color.

In step (1), the aforementioned pretreatment liquid containing the metal salt, the water-dispersible resin (A), the organic solvent (B) having an SP value of 10 to 14 $(cal/cm^3)^{1/2}$ and water is applied to a substrate. There are no particular limitations on the method used for applying the pretreatment liquid to the substrate, and either an inkjet method may be used, or application may be performed by screen printing, rolling, or spraying or the like. In the case of an inkjet method, examples of inkjet printers that can be used include the types of printers described below in relation to step (2). The pretreatment liquid is preferably applied to a region of the substrate that includes the print region in which the ink is to be applied to form an ink image, and for example, the pretreatment liquid may be applied to the entire surface of the substrate including the print region, or may be applied to only a portion of the substrate which includes the print region. In those cases where the pretreatment liquid is applied to the entire surface of the substrate, application by spraying or rolling or the like is preferred from a productivity perspective.

From the viewpoints of improving the ink coloration properties and the adhesion of the ink to the substrate, the amount applied of the pretreatment liquid, per unit area of the substrate, is preferably within a range from 40 to 400 g/m$^2$, and more preferably from 150 to 300 g/m$^2$. Further, it is even more preferable that the amount of the organic solvent (B) in the pretreatment liquid is from 5 to 15% by mass of the total mass of the pretreatment liquid, and that the amount applied of the pretreatment liquid satisfies the range described above.

In step (2), the aforementioned ink containing the pigment, the water-dispersible resin (C) having a glass transition point of 10° C. or higher, the organic solvent (D) and water is applied to the substrate to which the pretreatment liquid has already been applied. There are no particular limitations on the method used for applying the ink, and for example, an inkjet method may be used. When an inkjet method is used, examples of inkjet printers that can be used include printers that use any of various systems, including a piezo system, electrostatic system or thermal system, and, for example, liquid droplets of the ink are typically discharged from the inkjet head based on a digital signal, with the discharged ink droplets being adhered to the substrate.

The method may include other steps in addition to step (1) and step (2). For example, a heat treatment may be performed after step (1) and/or after step (2). There are no particular limitations on the heating conditions used in this heat treatment step. For example, a heat treatment may be performed after step (1) at a heating temperature of 100 to 180° C. (for example, 150° C.) for a prescribed time (for example, about 30 seconds), and a heat treatment may be performed after step (2) at a heating temperature of 100 to 180° C. (for example, 150° C.) for a prescribed time (for example, about 60 seconds).

An image may be formed by applying a plurality of inks.

EXAMPLES

The present invention is described below in further detail using a series of examples, but the present invention is in no way limited by these examples.

[Preparation of Pretreatment Liquids]

The materials shown in Table 1 were mixed together and then stirred for 30 minutes using a Mix Rotor to prepare pretreatment liquids 1 to 14.

The materials shown in Table 1 are listed below. In Table 1, the numerical values with no units shown for the various components represents % by mass values. In the case of each of the water-dispersible resins, the amount (% by mass) of the actual product (resin emulsion) is shown. Further, the units for the SP values are (cal/cm$^3$)$^{1/2}$.

<Metal Salts>

Calcium chloride (Wako 1st grade): manufactured by Wako Pure Chemical Industries, Ltd.

Calcium nitrate tetrahydrate (Wako 1st grade): manufactured by Wako Pure Chemical Industries, Ltd.

<Water-Dispersible Resins>

PRINTRITE DP375: manufactured by The Lubrizol Corporation, solid fraction: 32% by mass, Tg=48° C.

Mowinyl 780: manufactured by The Nippon Synthetic Chemical Industry Co., Ltd., solid fraction: 46% by mass, Tg=20° C.

Mowinyl 6750: manufactured by The Nippon Synthetic Chemical Industry Co., Ltd., solid fraction: 49% by mass, Tg=0° C.

SUPERFLEX 500M (SF500M): manufactured by DKS Co., Ltd., solid fraction: 45% by mass, Tg=−39° C.

<Organic Solvents>

Ethylene glycol (Wako 1st grade): manufactured by Wako Pure Chemical Industries, Ltd., SP value=14.8 (cal/cm$^3$)$^{1/2}$ 1,2-butanediol: manufactured by Tokyo Chemical Industry Co., Ltd., SP value=12.8 (cal/cm$^3$)$^{1/2}$ 1,2-hexanediol: manufactured by Tokyo Chemical Industry Co., Ltd., SP value=11.8 (cal/cm$^3$)$^{1/2}$ Diethylene glycol monobutyl ether: manufactured by Tokyo Chemical Industry Co., Ltd., SP value=10.5 (cal/cm$^3$)$^{1/2}$ Tetraethylene glycol dimethyl ether: manufactured by Tokyo Chemical Industry Co., Ltd., SP value=8.6 (cal/cm$^3$)$^{1/2}$ <Ion-Exchanged Water>

Ion-Exchanged Water

TABLE 1

| (% by mass) | | | Pretreatment liquid 1 | Pretreatment liquid 2 | Pretreatment liquid 3 | Pretreatment liquid 4 | Pretreatment liquid 5 | Pretreatment liquid 6 | Pretreatment liquid 7 | Pretreatment liquid 8 |
|---|---|---|---|---|---|---|---|---|---|---|
| Metal salt | Calcium chloride | | 10.0 | 10.0 | 10.0 | 10.0 | 10.0 | 10.0 | 10.0 | 10.0 |
| | Calcium nitrate | | | | | | | | | |
| Water-dispersible resin (A) | Printrite DP375 (solid fraction: 32% by mass) | Tg = 48° C. | | | | | | | | |
| | Mowinyl 780 (solid fraction: 46% by mass) | Tg = 20° C. | | | | | | | | |
| | Mowinyl 6750 (solid fraction: 49% by mass) | Tg = 0° C. | 20.4 | 20.4 | 20.4 | 20.4 | 20.4 | 20.4 | | 20.4 |
| | SF500M (solid fraction: 45% by mass) | Tg = −39° C. | | | | | | | 22.2 | |
| Organic solvent (B) | ethylene glycol | SP = 14.8 | | | 10.0 | | | | | |
| | 1,2-butanediol | SP = 12.8 | | | | 10.0 | | | | |
| | 1,2-hexanediol | SP = 11.8 | | | | | 10.0 | | | |
| | diethylene glycol | SP = 10.5 | | | | | | 10.0 | 10.0 | 3.0 |

TABLE 1-continued

| | | | | | | | | | |
|---|---|---|---|---|---|---|---|---|---|
| | monobutyl ether | | | | | | | 10.0 | |
| | tetraethylene glycol dimethyl ether | SP = 8.6 | | | | | | | |
| | Ion-exchanged water | | 69.6 | 59.6 | 59.6 | 59.6 | 59.6 | 57.8 | 66.6 |
| | Total | | 100.0 | 100.0 | 100.0 | 100.0 | 100.0 | 100.0 | 100.0 |

| (% by mass) | | | Pre-treatment liquid 9 | Pre-treatment liquid 10 | Pre-treatment liquid 11 | Pre-treatment liquid 12 | Pre-treatment liquid 13 | Pre-treatment liquid 14 | Pretreatment liquid 15 |
|---|---|---|---|---|---|---|---|---|---|
| Metal salt | Calcium chloride | | 10.0 | 10.0 | 10.0 | 10.0 | 10.0 | | 10.0 |
| | Calcium nitrate | | | | | | | 10.0 | |
| Water-dispersible resin (A) | Printrite DP375 (solid fraction: 32% by mass) | Tg = 48° C. | | | | 31.3 | | 31.3 | 31.3 |
| | Mowinyl 780 (solid fraction: 46% by mass) | Tg = 20° C. | | | | | 21.7 | | |
| | Mowinyl 6750 (solid fraction: 49% by mass) | Tg = 0° C. | 20.4 | 20.4 | 20.4 | | | | |
| | SF500M (solid fraction: 45% by mass) | Tg = −39° C. | | | | | | | |
| Organic solvent (B) | ethylene glycol | SP = 14.8 | | | | | | | |
| | 1,2-butanediol | SP = 12.8 | | | | | | | |
| | 1,2-hexanediol | SP = 11.8 | | | | | | | 10.0 |
| | diethylene glycol monobutyl ether | SP = 10.5 | 7.0 | 12.0 | 20.0 | 10.0 | 10.0 | 10.0 | |
| | tetraethylene glycol dimethyl ether | SP = 8.6 | | | | | | | |
| | Ion-exchanged water | | 62.6 | 57.6 | 49.6 | 48.8 | 58.3 | 48.8 | 48.8 |
| | Total | | 100.0 | 100.0 | 100.0 | 100.0 | 100.0 | 100.0 | 100.0 |

[Preparation of Inks]

First, 250 g of a white pigment R-21N (titanium oxide, manufactured by Sakai Chemical Industry Co., Ltd.) and 10 g of DEMOL EP (a polycarboxylate polymeric surfactant, manufactured by Kao Corporation) as a dispersant were mixed with 740 g of ion-exchanged water, and a beads mill containing ø0.5 mm zirconia beads was used to disperse the mixture to obtain a white (W) pigment dispersion.

The thus obtained white (W) pigment dispersion was then mixed with the remaining materials shown in Table 2 and stirred for 30 minutes using a Mix Rotor to prepare a series of inks 1 to 6.

The materials shown in Table 2 were as described below. In Table 2, the numerical values with no units shown for the various components represents % by mass values. In the case of each of the water-dispersible resins, the amount (% by mass) of the actual product (resin emulsion) is shown. Similarly, for the dispersant, the amount (% by mass) of the actual product (DEMOL EP) is shown. Further, the units for the SP values are $(cal/cm^3)^{1/2}$.

<Pigment>
R-21N: titanium oxide (white pigment), manufactured by Sakai Chemical Industry Co., Ltd.

<Dispersant>
DEMOL EP: a polycarboxylate polymeric surfactant (a surfactant-type dispersant) manufactured by Kao Corporation, solid fraction: 25% by mass <Water-Dispersible Resins>
SUPERFLEX 150H (SF150H): manufactured by DKS Co., Ltd., solid fraction: 30% by mass, Tg=40° C.

Mowinyl 1752: manufactured by The Nippon Synthetic Chemical Industry Co., Ltd., solid fraction: 50% by mass, Tg=16° C.

Mowinyl 6750: manufactured by The Nippon Synthetic Chemical Industry Co., Ltd., solid fraction: 49% by mass, Tg=0° C.

SUPERFLEX 420 (SF420): manufactured by DKS Co., Ltd., solid fraction: 30% by mass, Tg=−10° C.

<Organic Solvents>
Diethylene glycol (Wako 1st grade): manufactured by Wako Pure Chemical Industries, Ltd., SP value=15.0 $(cal/cm^3)^{1/2}$ Ethylene glycol: manufactured by Tokyo Chemical Industry Co., Ltd., SP value=14.8 $(cal/cm^3)^{1/2}$ 1,2-hexanediol: manufactured by Tokyo Chemical Industry Co., Ltd., SP value=11.8 $(cal/cm^3)^{1/2}$ <Surfactant>
Surfynol 465: an acetylene glycol-based surfactant, manufactured by Air Products and Chemicals, Inc.

<Ion-Exchanged Water>
Ion-Exchanged Water

TABLE 2

| (% by mass) | | Ink 1 | Ink 2 | Ink 3 | Ink 4 | Ink 5 | Ink 6 |
|---|---|---|---|---|---|---|---|
| Pigment | R-21N | 10.0 | 10.0 | 10.0 | 10.0 | 10.0 | 10.0 |
| Dispersant | DEMOL EP (solid fraction: 25% by mass) | 0.4 | 0.4 | 0.4 | 0.4 | 0.4 | 0.4 |
| Water-dispersible resin (C) | SF150H (solid fraction: 30% by mass) Tg = 40° C. | 33.3 | 33.3 | 33.3 | | | |

TABLE 2-continued

| (% by mass) | | | Ink 1 | Ink 2 | Ink 3 | Ink 4 | Ink 5 | Ink 6 |
|---|---|---|---|---|---|---|---|---|
| | Mowinyl 1752 (solid fraction: 50% by mass) | Tg = 16° C. | | | | 20.4 | | |
| | Mowinyl 6750 (solid fraction: 49% by mass) | Tg = 0° C. | | | | | 20.4 | |
| | SF420 (solid fraction: 30% by mass) | Tg = −10° C. | | | | | | 33.3 |
| Organic solvent (D) | diethylene glycol | SP = 15.0 | | 20 | | 20 | 20 | 20 |
| | ethylene glycol | SP = 14.8 | | | 20 | | | |
| | 1,2-hexanediol | SP = 11.8 | 20 | | | | | |
| Surfactant | Surfynol 465 | | 1.0 | 1.0 | 1.0 | 1.0 | 1.0 | 1.0 |
| | Ion-exchanged water | | 35.3 | 35.3 | 35.3 | 48.2 | 48.2 | 35.3 |
| | Total | | 100.0 | 100.0 | 100.0 | 100.0 | 100.0 | 100.0 |

[Evaluations]

<Preparation of Printed Items (Printed Textile Items)>

A black 100% cotton T-shirt "Printstar 085-cvt" (manufactured by Toms Co., Ltd.) was prepared as a substrate, the pretreatment liquid was sprayed onto the substrate in an amount of 200 g/m$^2$, and a heat press device was used to perform heat fixing at 150° C. for 30 seconds.

The ink was filtered using a 5 μm cellulose acetate syringe filter, and then loaded into an inkjet printer (a textile printer MMP-8130 manufactured by Mastermind Inc.). Using the printer containing the loaded ink, a solid image of 100 mm×200 mm was printed onto the above substrate that had been coated with the pretreatment liquid and then subjected to a heat fixing treatment, and a final fixing treatment was then performed heating at 150° C. for 60 seconds.

<Method for Evaluating Substrate Adhesion>

Using the printed item (printed textile item) prepared in the manner described above as a test piece, a test was performed using a type-II rubbing tester (RT-200, manufactured by Daiei Kagaku Seiki Mfg. Co., Ltd.) in accordance with the method prescribed in JIS L0849. The degree of stripping of the white ink coating film from the substrate as a result of the rubbing was inspected visually, and evaluated against the following criteria. The results are shown in Tables 3 to 5.

A: stripping of the white ink coating film represents less than 5% of the surface area subjected to rubbing B: stripping of the white ink coating film represents at least 5% but less than 15% of the surface area subjected to rubbing C: stripping of the white ink coating film represents 15% or more of the surface area subjected to rubbing <Method for Evaluating Scratch Resistance>

Using a commercially available toothbrush (bristle material: nylon, hardness: normal), the ink image surface of the printed portion of the printed item prepared in the manner described above was brushed by rubbing the toothbrush 10 times back and forth across the surface of the ink image with a load of 100 g applied to the head of the toothbrush. The degree of scratching of the ink image of the printed portion was then inspected visually from a distance of 30 cm, and evaluated against the following criteria. The results are shown in Tables 3 to 5.

A: no scratches

B: some scratches, but not easily noticeable

C: noticeable scratches

<Method for Evaluating Stickiness of Unprinted Portion>

The printed item prepared in the manner described above was cut to dimensions of 20 mm×20 mm, a PET film was pressed against an unprinted portion to which the pretreatment liquid had been applied, and after standing for 5 seconds, the PET film was grasped and lifted up. The stickiness was evaluated on the basis of the degree of detachability of the cotton from the PET film. The results are shown in Tables 3 to 5.

A: the printed item is not lifted up (almost no stickiness)

B: the printed item is lifted up, but immediately falls under its own weight (some slight stickiness)

C: the time taken for the printed item to fall from the PET film under its own weight is one second or longer (significant stickiness)

In Examples and Comparative Examples, the pretreatment liquid and the ink as shown in the following Tables 3 to 5 were used. In the following Tables 3 to 5, "P liquid" indicates "pretreatment liquid". Further, in the following Tables 3 to 5, the units for the SP values are (cal/cm$^3$)$^{1/2}$

TABLE 3

| | Example 1 | Example 2 | Example 3 | Example 4 | Example 5 | Example 6 | Example 7 | Example 8 | Example 9 | Example 10 |
|---|---|---|---|---|---|---|---|---|---|---|
| (Pretreatment liquid) | P liquid 4 | P liquid 4 | P liquid 4 | P liquid 4 | P liquid 3 | P liquid 5 | P liquid 7 | P liquid 8 | P liquid 9 | P liquid 10 |
| Water-dispersible resin (A), Tg (° C.) | 0° C. | 0° C. | 0° C. | 0° C. | 0° C. | 0° C. | −39° C. | 0° C. | 0° C. | 0° C. |
| Organic solvent (B), SP value | 11.8 | 11.8 | 11.8 | 11.8 | 12.8 | 10.5 | 10.5 | 10.5 | 10.5 | 10.5 |
| Organic solvent (B), amount | 10 mass % | 10 mass % | 10 mass % | 10 mass % | 10 mass % | 10 mass % | 10 mass % | 3 mass % | 7 mass % | 20 mass % |
| (Ink) | Ink 1 | Ink 2 | Ink 3 | Ink 4 | Ink 1 | Ink 1 | Ink 1 | Ink 1 | Ink 1 | Ink 1 |
| Water-dispersible resin (C), Tg (° C.) | 40° C. | 40° C. | 40° C. | 16° C. | 40° C. | 40° C. | 40° C. | 40° C. | 40° C. | 40° C. |
| Organic solvent (D), SP value | 11.8 | 15.0 | 14.8 | 15.0 | 11.8 | 11.8 | 11.8 | 11.8 | 11.8 | 11.8 |
| Substrate adhesion | A | A | A | A | A | A | A | B | A | A |
| Scratch resistance | B | A | A | A | B | B | B | B | B | B |
| Stickiness of unprinted portion | B | B | B | B | B | B | B | B | B | B |

TABLE 4

|  | Example 11 | Example 12 | Example 13 | Example 14* | Example 15 | Example 16 | Example 17 | Example 18 |
|---|---|---|---|---|---|---|---|---|
| (Pretreatment liquid) | P liquid 11 | P liquid 12 | P liquid 13 | P liquid 14 | P liquid 15 | P liquid 12 | P liquid 12 | P liquid 15 |
| Water-dispersible resin (A), Tg (° C.) | 0° C. | 48° C. | 20° C. | 48° C. | 48° C. | 48° C. | 48° C. | 48° C. |
| Organic solvent (B), SP value | 10.5 | 10.5 | 10.5 | 10.5 | 11.8 | 10.5 | 10.5 | 11.8 |
| Organic solvent (B), amount | 20 mass % | 10 mass % | 10 mass % | 10 mass % | 10 mass % | 10 mass % | 10 mass % | 10 mass % |
| (Ink) | Ink 1 | Ink 1 | Ink 1 | Ink 1 | Ink 1 | Ink 2 | Ink 4 | Ink 3 |
| Water-dispersible resin (C), Tg (° C.) | 40° C. | 40° C. | 40° C. | 40° C. | 40° C. | 40° C. | 16° C. | 40° C. |
| Organic solvent (D), SP value | 11.8 | 11.8 | 11.8 | 11.8 | 11.8 | 15.0 | 15.0 | 14.8 |
| Substrate adhesion | B | A | A | A | A | A | A | A |
| Scratch resistance | B | B | B | B | B | A | A | A |
| Stickiness of unprinted portion | B | A | A | A | A | A | A | A |

*Contains calcium nitrate as a metal salt

TABLE 5

|  | Comparative Example 1 | Comparative Example 2 | Comparative Example 3 | Comparative Example 4 | Comparative Example 5 |
|---|---|---|---|---|---|
| (Pretreatment liquid) | P liquid 1 | P liquid 2 | P liquid 6 | P liquid 4 | P liquid 4 |
| Water-dispersible resin (A), Tg (° C.) | 0° C. | 0° C. | 0° C. | 0° C. | 0° C. |
| Organic solvent (B), SP value | — | 14.8 | 8.6 | 11.8 | 11.8 |
| Organic solvent (B), amount | — | 10 mass % | 10 mass % | 10 mass % | 10 mass % |
| (Ink) | Ink 1 | Ink 1 | Ink 1 | Ink 5 | Ink 6 |
| Water-dispersible resin (C), Tg (° C.) | 40° C. | 40° C. | 40° C. | 0° C. | −10° C. |
| Organic solvent (D), SP value | 11.8 | 11.8 | 11.8 | 15.0 | 15.0 |
| Substrate adhesion | C | C | A | B | B |
| Scratch resistance | B | B | B | C | C |
| Stickiness of unprinted portion | B | B | C | B | B |

In Examples 1 to 9, each of which used a pretreatment liquid containing a metal salt, the water-dispersible resin (A), the organic solvent (B) having an SP value of 10 to 14 $(cal/cm^3)^{1/2}$ and water, and an ink containing a pigment, the water-dispersible resin (C) having a glass transition point of 10° C. or higher, the organic solvent (D) and water, favorable results were obtained for each of the evaluation items, namely "substrate adhesion", "scratch resistance" and "stickiness of the unprinted portion", confirming that a printed item could be produced which exhibited excellent adhesion between the ink and the substrate, excellent scratch resistance of the ink image of the printed portion, and reduced stickiness for the unprinted portion.

In Examples 2, 3, 4, 16, 17 and 18, in which the SP value of the organic solvent (D) of the ink was 14.5 $(cal/cm^3)^{1/2}$ or greater, particularly superior results were obtained for the scratch resistance. In Examples 12 to 18, in which the glass transition point of the water-dispersible resin (A) in the pretreatment liquid was 15° C. or higher, particularly superior results were obtained for the stickiness of the unprinted portion.

In contrast, in Comparative Example 1, in which the pretreatment liquid did not contain an organic solvent, and in Comparative Example 2, in which the SP value of the organic solvent of the pretreatment liquid exceeded 14, the substrate adhesion was poor. Further, in Comparative Example 3, in which the SP value of the organic solvent in the pretreatment liquid was less than 10, the result for the stickiness of the unprinted portion was poor. In Comparative Examples 4 and 5, in which the glass transition point of the water-dispersible resin of the ink was low, the scratch resistance was poor.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An ink set for textile printing, comprising:
   a pretreatment liquid containing a metal salt, a water-dispersible resin (A), an organic solvent (B) having an SP value of 10 to 14 $(cal/cm^3)^{1/2}$ and water, and
   an ink containing a pigment, a water-dispersible resin (C) having a glass transition point of 15 to 50° C., an organic solvent (D) and water.

2. The ink set for textile printing according to claim 1, wherein a glass transition point of the water-dispersible resin (A) of the pretreatment liquid is 15° C. or higher.

3. The ink set for textile printing according to claim 1, wherein the SP value of the organic solvent (B) of the pretreatment liquid is no higher than an SP value of the organic solvent (D) of the ink.

4. The ink set for textile printing according to claim 1, wherein an SP value of the organic solvent (D) of the ink is 14.5 $(cal/cm^3)^{1/2}$ or higher.

5. The ink set for textile printing according to claim 1, wherein an amount of the organic solvent (B) of the pretreatment liquid is from 5 to 15% by mass relative to a total mass of the pretreatment liquid.

6. The ink set for textile printing according to claim 1, wherein a glass transition point of the water-dispersible resin (A) of the pretreatment liquid is at least as high as the glass transition point of the water-dispersible resin (C) of the ink.

7. A method for producing a printed textile item, the method comprising:
applying a pretreatment liquid containing a metal salt, a water-dispersible resin (A), an organic solvent (B) having an SP value of 10 to 14 $(cal/cm^3)^{1/2}$ and water to a substrate, and
applying an ink containing a pigment, a water-dispersible resin (C) having a glass transition point of 15 to 50° C., an organic solvent (D) and water to the substrate to which the pretreatment liquid has been applied.

8. The method for producing a printed textile item according to claim 7, wherein the substrate is a fabric.

9. The method for producing a printed textile item according to claim 7, wherein a glass transition point of the water-dispersible resin (A) of the pretreatment liquid is 15° C. or higher.

10. The method for producing a printed textile item according to claim 7, wherein the SP value of the organic solvent (B) of the pretreatment liquid is no higher than an SP value of the organic solvent (D) of the ink.

11. The method for producing a printed textile item according to claim 7, wherein an SP value of the organic solvent (D) of the ink is 14.5 $(cal/cm^3)^{1/2}$ or higher.

12. The method for producing a printed textile item according to claim 7, wherein an amount of the organic solvent (B) of the pretreatment liquid is from 5 to 15% by mass relative to a total mass of the pretreatment liquid.

13. The method for producing a printed textile item according to claim 7, wherein a glass transition point of the water-dispersible resin (A) of the pretreatment liquid is at least as high as the glass transition point of the water-dispersible resin (C) of the ink.

14. The ink set for textile printing according to claim 1, wherein the SP value of the organic solvent (B) of the pretreatment liquid is lower than an SP value of the organic solvent (D) of the ink.

15. The method for producing a printed textile item according to claim 7, wherein the SP value of the organic solvent (B) of the pretreatment liquid is lower than an SP value of the organic solvent (D) of the ink.

16. The ink set for textile printing according to claim 1, wherein the organic solvent (B) of the pretreatment liquid comprises a glycol ether.

17. The ink set for textile printing according to claim 1, wherein the organic solvent (B) of the pretreatment liquid comprises at least one selected from the group consisting of diethylene glycol monobutyl ether, triethylene glycol monoethyl ether and diethylene glycol monomethyl ether.

18. The method for producing a printed textile item according to claim 7, wherein the organic solvent (B) of the pretreatment liquid comprises a glycol ether.

19. The method for producing a printed textile item according to claim 7, wherein the organic solvent (B) of the pretreatment liquid comprises at least one selected from the group consisting of diethylene glycol monobutyl ether, triethylene glycol monoethyl ether and diethylene glycol monomethyl ether.

* * * * *